United States Patent [19]
Tanner et al.

[11] Patent Number: 5,213,858
[45] Date of Patent: May 25, 1993

[54] BIODEGRADABLE PAPERBOARD LAMINATE STRUCTURE

[75] Inventors: Cynthia L. Tanner; Charles E. Gibbons, both of Mobile, Ala.

[73] Assignee: International Paper, Tuxedo Park, N.Y.

[21] Appl. No.: 762,054

[22] Filed: Sep. 19, 1991

Related U.S. Application Data

[63] Continuation of Ser. No. 504,229, Apr. 4, 1990, abandoned.

[51] Int. Cl.$^5$ .............. B65D 5/62; B32B 27/10
[52] U.S. Cl. .................. 428/34.2; 428/349; 428/479.6; 428/481; 428/511; 428/513; 428/514; 428/913; 229/3.5 R
[58] Field of Search .......... 428/34.2, 349, 479.6, 428/481, 513, 514, 511, 913, 34.3; 383/1; 229/3.5 R; 426/127, 415; 524/47

[56] References Cited

U.S. PATENT DOCUMENTS

| | | | |
|---|---|---|---|
| Re. 33,376 | 10/1990 | Gibbons et al. | 428/34.2 |
| 3,299,181 | 1/1967 | Coover et al. | 525/227 |
| 3,532,534 | 2/1967 | Wolff | 427/337 |
| 3,811,931 | 5/1974 | Guillet | 428/35.8 |
| 3,952,347 | 4/1976 | Comerford et al. | 5/484 |
| 4,016,117 | 4/1977 | Griffin | 523/128 |
| 4,021,388 | 5/1977 | Griffin | 523/128 |
| 4,094,718 | 6/1978 | Czerwin | 156/210 |
| 4,513,036 | 4/1985 | Thompson et al. | 206/524.6 |
| 4,606,951 | 8/1986 | Wakasugi et al. | 428/34.3 |
| 4,617,239 | 10/1986 | Maruyama et al. | 428/452 |
| 4,698,246 | 10/1987 | Gibbons et al. | 428/34.2 |
| 4,701,360 | 10/1987 | Gibbons et al. | 428/34.2 |
| 4,709,808 | 12/1987 | Balduff et al. | 206/158 |
| 4,789,575 | 12/1988 | Gibbons et al. | 428/34.2 |
| 4,802,943 | 2/1989 | Gibbons et al. | 156/244.23 |
| 4,806,399 | 2/1989 | Gibbons et al. | 428/34.2 |
| 4,835,025 | 5/1989 | Thompson et al. | 428/34.2 |
| 4,859,513 | 8/1989 | Gibbons et al. | 428/34.2 |
| 4,861,526 | 8/1989 | Gibbons et al. | 264/22 |
| 4,880,701 | 11/1989 | Gibbons et al. | 428/34.2 |
| 4,888,222 | 12/1989 | Gibbons et al. | 428/34.2 |
| 4,921,733 | 5/1990 | Gibbons et al. | 428/34.2 |
| 4,929,476 | 5/1990 | Gibbons et al. | 428/34.2 |
| 4,940,612 | 7/1990 | Gibbons et al. | 428/34.2 |
| 4,948,640 | 8/1990 | Gibbons et al. | 428/34.9 |
| 4,981,739 | 1/1991 | Gibbons et al. | 428/34.2 |
| 4,983,431 | 1/1991 | Gibbons et al. | 428/34.2 |
| 4,988,546 | 1/1991 | Tanner et al. | 428/34.2 |
| 5,002,833 | 3/1991 | Kinsey, Jr. et al. | 428/475.8 |

Primary Examiner—Ellis P. Robinson
Assistant Examiner—Rena L. Dye
Attorney, Agent, or Firm—Michael Doyle; Stewart L. Gitler

[57] ABSTRACT

The present invention relates to a biodegradable paperboard-based package for various food products. The package utilizes a novel heat-sealable laminate structure wherein the exterior gloss heat-sealable layer is a degradable polymeric resin material such as a polyvinyl alcohol resin or a starch based low density polyethylene polymer resin. Utilization of the material in a novel fashion accelerates the paperboard substrate's degradative properties and tendencies.

27 Claims, 1 Drawing Sheet

```
D. POLYMER           - 10
BOARD                - 12
POLYMER RESIN        - 14
```

FIG. 1
D. POLYMER — 10
BOARD — 12
POLYMER RESIN — 14

FIG. 2
D. POLYMER — 16
BOARD — 18
BARRIER MATERIAL — 20
POLYMER RESIN — 22

FIG. 3
D. POLYMER — 24
BOARD — 26
TIE LAYER — 28
BARRIER MATERIAL — 30
POLYMER RESIN — 32

FIG. 4
D. POLYMER — 34
BOARD — 36
TIE LAYER — 38
BARRIER MATERIAL — 40
TIE LAYER — 42
POLYMER RESIN — 44

BIODEGRADABLE PAPERBOARD LAMINATE STRUCTURE

This is a continuation of copending application(s) Ser. No. 504,229 filed on Apr. 4, 1990 is now abandoned.

BACKGROUND OF THE INVENTION

The invention relates to a heat-sealable paperboard laminate structure for use as a container of various food products. More particularly, this invention relates to a laminate structure for use in a container or the like containing an outer non-food contact layer of a biodegradable polymeric material. Coating one side of the package with a biodegradable resin increases the amount of surface area that is accessible to microbial action.

Heat-sealable paperboard containers comprised of various laminate structures are widely used in the container industry. A growing concern regarding the solid-waste disposal of containers coated on two sides with non-degradable polymers has arisen, and a solution to the non-readily biodegradable container has been widely sought.

One solution to the industry wide problem is to produce a container comprised of 100% recyclable high density polyethylene. This solution is problematical for reuse in the same packaging application due to the strict FDA standards which prevent use of recycled products for food contact. More problematical are blended laminate plastic structures, which are not recyclable due to the inability to effectively separate the various blended layers during recycling. All plastic containers are essentially non-biodegradable, also.

If incineration of the plastic container is attempted to minimize the amount of solid waste, environmental problems are encountered due to the release of heavy metal catalysts into the atmosphere.

Essentially, 100% plastic containers create enormous solid-waste disposal problems and a number of State governments have enacted legislation to ban or tax the use of plastic packages or containers.

An alternative solution to the industry wide problem is to utilize "one-side" paperboard structures which comprise 90-95% paperboard and which biodegrade at a rapid rate over time.

These containers possess deficiencies in that they are coated only on one side by layers of polymer resins to prevent leakage and spoilage of the food product contained therein, and not on both sides causing poor mechanical integrity with large size containers, leakage, and ineffective seams.

It is an object of this invention to produce a paperboard-based packaging material that possesses superior barrier and container properties as well as the ability to substantially biodegrade at a rapid rate over time.

It is an object of this invention to produce a paperboard-based packaging material that is coated on its exterior non-food product contact side with a biodegradable thermoplastic material and on its interior food contact side with a selected barrier resin material.

It is an object of this invention to produce a novel paperboard-based packaging material which meets and in some cases exceeds the degradability standards being imposed by State legislatures.

To date, there have been no commercially available paperboard-based or 100% plastic resin structure which produces a package which will biodegrade at a rapid rate and be structurally strong enough to hold food products in an acceptable manner.

SUMMARY OF THE INVENTION

A preferred embodiment of the invention reveals a biodegradable paperboard-based laminate for producing a package for liquid and non-liquid food products. The preferred laminate structure of the present invention provides, when assembled into a blank, cup, container, food package or the like, a structurally strong and rapidly biodegradable product over time, due to the use of an exterior coating of a heat-sealable biodegradable polymer resin coated onto the paperboard substrate.

A preferred embodiment of the laminate structure comprises a paperboard substrate; a matte layer of polyethylene extrusion coated onto the product-contact side of the paperboard, and a gloss layer of a biodegradable thermoplastic material extrusion coated on the exterior of the paperboard corresponding to the package outside (print side). The extrusion-coated paperboard is then converted into packages, such as gable-top milk and juice cartons, brick type aseptic cartons, folding cartons, or paper-based cups or plates.

The paperboard-based laminate structure can incorporate on its interior food contact side a number of additional barrier or tie layers (whether buried or in direct food contact), and these comprise only 5% to 7% of the overall structure wherein 93% to 95% of the structure will degrade.

The positioning of degradable material on the non-product contact side will enable microorganisms and moisture to reach the discarded paperboard package over time and accelerate the degradation of the board, which comprises 90%+ of the package.

The interior non-degradable polymeric material will insulate the food product from spoilage or contamination.

Degradable polymeric films can be extrusion coated, or laminated to the base paperboard stock during production.

BRIEF DESCRIPTION OF THE DRAWINGS

FIG. 1 is a cross-sectional elevation of a preferred embodiment of the present invention; and FIG. 2 is a cross-sectional elevation of an alternate embodiment of the present invention.

FIG. 3 is a cross-sectional elevation of an alternate embodiment of the present invention.

FIG. 4 is a cross-sectional elevation of an alternate embodiment of the present invention.

DETAILED DESCRIPTION OF THE INVENTION

A preferred embodiment of the present invention is for a biodegradable two-side coated paperboard-based laminate structure as disclosed in FIG. 1. All weights given for particular laminate layers in all four embodiments of the invention are expressed in pounds per 3,000 square feet. Disclosed, in FIG. 1, is a paperboard substrate 12 having an interior and exterior side corresponding to the interior and exterior of a package or container assembled therefrom, which is most suitably high grade paperboard having a weight of 100–300 pounds (282 lbs. for a half-gallon carton); to which is applied on its exterior side a coating of a degradable polymer resin 10 in a coating weight of 7 to 20 lbs., preferably 9 lbs. Degradable polymer resins which may be used for the purposes of this non-food product contact exterior layer are heat-sealable thermoplastic polyvinyl alcohol resins and heat-sealable low temperature starch based low density polyethylene resins. Low temperature addresses an application temperature below the degradability temperature of the starch additive. On the underside or interior food product contact side of the paperboard substrate 12 is extrusion coated thereon a heat-sealable polymeric resin 14 which when the laminate is formed into a blank or container will heat-seal with the exterior layer of degradable polymer resin on conventional heat-seal equipment at conventional heat seal temperatures ranging from 250° F.–500° F. The preferred weight range of the interior layer 14 is roughly 7 pounds to 20 pounds, with 15 pounds being preferred for a subsequently assembled half-gallon container. Polymeric resins suitable for the interior food contact layer of the present invention are low density polyethylene polymer, glycol modified polyethylene terephthalate, acid-modified polyethylene terephthalate, ethylene vinyl alcohol copolymer, and the like.

Referring to FIG. 2, an alternate preferred embodiment of the laminate of the present invention is shown. The embodiment adds an additional buried barrier layer into the structure to enhance the overall barrier properties of a container constructed from the structure. This structure has the following components: A paperboard substrate 18 having an interior and an exterior side corresponding to the interior and exterior of a package or container assembled therefrom, which is most suitably high grade paperboard having a weight 100–300 pounds (282 lbs. for a half-gallon carton); to which is applied on the exterior side a degradable polymer resin 16 in a coating weight of 7 to 20 lbs., preferably 9 lbs. Degradable polymer resins which may be used for the purposes of this non-food product contact exterior layer are heat-sealable thermoplastic polyvinyl alcohol resins and heat-sealable low temperature starch based low density polyethylene resins. On the underside or interior side of the paperboard substrate there is coated a barrier layer 20 of a selected material such as ethylene vinyl alcohol copolymer, polyethylene terephthalate, glycol-modified polyethylene terephthalate, acid-modified polyethylene terephthalate, polyamide polymer or polyamide copolymers, or the like, to give additional barrier properties to the overall containers formed from the resultant laminate structure. The barrier layers can have weights ranging from 4 to 15 lbs. On the underside or interior side of the barrier layer there is coated a layer of a heat-sealable (FDA approved for product contact) polymer resin 22. Suitable polymer resins for this purpose are low density polyethylene polymer and the like. Weights of 7 to 20 pounds are suitable, with a weight of 15 lbs. being the preferred weight for a subsequently assembled half-gallon carton.

The interior layers and/or exterior layer of the structure can be extrusion or coextrusion coated; or extrusion, coextrusion or adhesion laminated during assembly onto the substrate or onto each polymer layer or the like.

Referring to FIG. 3, an alternate embodiment of the present invention is disclosed. Essentially, the structure resembles the embodiment outlined in FIG. 2 with an additional adhesive tie layer 28 placed between the substrate 26 and the barrier material layer 30. The tie material layer has a weight ranging from 2 to 6 lbs. and can be comprised of any of the following: ethylene based copolymers with grafted functional groups; modified polyethylene resin containing vinyl acetate, acrylate, or methacrylate comonomers; and ethylene-based multipolymer materials with or without grafted functional groups.

The structure from exterior (gloss) layer to interior (matte) food contact layer is as follows: a heat-sealable exterior gloss layer of a degradable polymeric resin 24 having a weight of 7 to 20 lbs., preferably a starch based polyethylene resin or a thermoplastic polyvinyl alcohol resin; a substrate layer of high grade paperboard 26 having a weight of 100 to 300 lbs.; an interior adhesive tie layer 28 having a weight of 2 to 6 lbs., preferably an ethylene based copolymer with grafted functional groups; a barrier layer 30 having a weight of 4 to 15 lbs., preferably ethylene vinyl alcohol copolymer; and a heat-sealable layer 32 of polymeric material having a weight of 7 to 20 lbs., rendering the finished laminate structure, if desired, heat-sealable on conventional heat-seal equipment at conventional heat-seal temperatures (250°–500° F.).

Referring to FIG. 4, there is disclosed a structure similar to that of FIG. 3, wherein an additional tie layer 42 is placed between the barrier material layer 40 and the polymeric resin layer 44. This layer is added for better adhesion when utilizing selected barrier materials, such as ethylene vinyl alcohol copolymer, polyethylene terephthalate, etc.

In FIGS. 3 and 4, the layer or layers of tie material, barrier material and food-contact polymer resin material can be applied onto the board by extrusion or coextrusion coating; extrusion, coextrusion, or adhesive lamination.

The structure of embodiment 4 from exterior (gloss) layer to interior (matte) food contact layer is as follows: a heat-sealable exterior gloss layer of a degradable polymeric resin 34, having a weight of 7 to 20 lbs.; a substrate layer of high grade paperboard 36 having a weight of 100 to 300 lbs.; a first interior adhesive tie layer 38 having a weight of 2 to 6 lbs.; a barrier layer 40 having a weight of 4 to 15 lbs.; a second interior adhesive tie layer 42 having a weight of 2 to 6 lbs.; and a heat-sealable layer 44 of a polymeric material having a weight of 7 to 20 lbs., rendering the finished structure, if desired, heat-sealable on conventional heat-seal equipment at conventional heat-seal temperatures (250° F.–500° F.).

The structures outlined in FIGS. 1–4 all make novel use of a heat-sealable degradable polymer resin material as the exterior coating of the paperboard substrate. Utilization of this novel layer or a structure enables microorganisms to readily attack the discarded paperboard article and accelerate degradation.

These structures can be assembled into gable-top cartons, folding cartons, cold or hot drink cups or the like and comply with State legislative standards for degradability.

Although specific coating techniques have been described, any appropriate technique for applying the layers onto the paperboard substrate can be suitably employed, such as extrusion, coextrusion coating, or extrusion, coextrusion and adhesive lamination of a single layer and/or multilayer films, as desired, to achieve the stated inventions described herein.

The unique product resulting fills a recognized need to produce a package which will degrade almost entirely (95%) and rapidly once discarded by the consumer.

We claim:

1. A biodegradable paperboard-based laminate structure for producing a degradable paperboard-based package comprising:
   a) a paperboard substrate having an interior side and an exterior side;
   b) at least one exterior layer of a low temperature extrusion coatable grade heat-sealable biodegradable polymer resin applied on said exterior side of said paperboard substrate; and
   c) an interior layer of a heat-sealable non-biodegradable polymer resin applied on said interior side of said paperboard substrate, which is heat-sealable with the exterior layer of a biodegradable polymer resin.

2. A biodegradable paperboard-based laminate structure for producing a degradable paperboard based package as claimed in claim 1, wherein said exterior layer of a low temperature extrusion coatable grade heat-sealable biodegradable polymer resin is thermoplastic polyvinyl alcohol resin or starch-based low density polyethylene polymer resin.

3. A biodegradable paperboard-based laminate structure for producing a degradable paperboard based package as claimed in claim 1, wherein said interior layer of a heat-sealable polymer resin is low density polyethylene polymer, ethylene vinyl alcohol copolymer, glycol-modified polyethylene terephthalate, acid-modified polyethylene terephthalate, polyamide polymer or polyamide copolymers.

4. A biodegradable paperboard-based laminate structure for producing a degradable paperboard based package as claimed in claim 1, further comprising a barrier layer material placed on the interior of said paperboard substrate layer and directly contacting said interior heat-sealable polymer resin layer.

5. A biodegradable paperboard-based laminate structure for producing a degradable paperboard based package as claimed in claim 4, wherein said barrier material layer is ethylene vinyl alcohol copolymer, polyamide polymer, polyamide copolymer, polyethylene terephthalate, glycol-modified polyethylene terephthalate or acid-modified polyethylene terephthalate.

6. A biodegradable paperboard-based laminate structure for producing a degradable paperboard based package as claimed in claim 4, further comprising a first adhesive tie material layer placed between the interior of said paperboard substrate and said barrier material layer.

7. A biodegradable paperboard-based laminate structure for producing a degradable paperboard based package as claimed in claim 6, wherein said first adhesive tie material layer is ethylene based copolymers with grafted functional groups; modified polyethylene copolymers containing vinyl acetate acrylate, methacrylate comonomers; ethylene-based multi-polymer materials with grafted functional groups or ethylene-based multi-polymer materials without grafted functional groups.

8. A biodegradable paperboard-based laminate structure for producing a degradable paperboard based package as claimed in claim 6, further comprising a second adhesive tie material layer placed between said barrier material layer and said interior heat-sealable polymer resin layer.

9. A biodegradable paperboard-based laminate structure for producing a degradable paperboard based package as claimed in claim 8, wherein said second adhesive tie material is ethylene based copolymers with grafted functional groups; modified polyethylene copolymers containing vinyl acetate acrylate, methacrylate comonomers; ethylene-based multi-polymer based materials with grafted functional groups or ethylene-based multi-polymer materials without grafted functional groups.

10. A biodegradable paperboard-based blank made from a biodegradable-based laminate comprising:
    a) a paperboard substrate having an interior side and an exterior side;
    b) at least one exterior layer of a low temperature extrusion coatable grade heat-sealable biodegradable polymer resin applied on said exterior side of said paperboard substrate; and
    c) an interior layer of a heat-sealable non-biodegradable polymer resin applied on said interior side of said paperboard substrate, which is heat-sealable with the exterior layer of a biodegradable polymer resin.

11. A biodegradable paperboard-based blank made from a biodegradable-based laminate as claimed in claim 10, wherein said exterior layer of a low temperature extrusion coatable grade heat-sealable biodegradable polymer resin is thermoplastic polyvinyl alcohol resin or starch-based low density polyethylene polymer resin.

12. A biodegradable paperboard-based blank made from a biodegradable-based laminate as claimed in claim 10, wherein said interior of a heat-sealable polymer resin is low density polyethylene polymer, ethylene vinyl alcohol copolymer, glycol-modified polyethylene terephthalate, or acid-modified polyethylene terephthalate.

13. A biodegradable paperboard-based blank made from a biodegradable-based laminate as claimed in claim 10, further comprising a barrier layer material placed on the interior of said paperboard substrate layer and directly contacting said interior heat-sealable polymer resin layer.

14. A biodegradable paperboard-based blank made from a biodegradable-based laminate as claimed in claim 13 wherein said barrier material layer is ethylene vinyl alcohol copolymer, polyamide polymer, polyamide copolymer, polyethylene terephthalate, glycol-modified polyethylene terephthalate or acid-modified polyethylene terephthalate.

15. A biodegradable paperboard-based blank made from a biodegradable-based laminate as claimed in claim 14, further comprising a first adhesive tie material layer placed between the interior of said paperboard substrate and said barrier material layer.

16. A biodegradable paperboard-based blank made from a biodegradable-based laminate as claimed in claim 15, wherein said first adhesive tie material layer is ethylene based copolymers with grafted functional groups; modified polyethylene copolymers containing vinyl acetate acrylate, methacrylate comonomers; ethylene-based multi-polymer materials with grafted functional groups or ethylene-based multi-polymer materials without grafted functional groups.

17. A biodegradable paperboard-based blank made from a biodegradable-based laminate as claimed in claim 15, further comprising a second adhesive tie material layer placed between said barrier material layer and said interior heat-sealable polymer resin layer.

18. A biodegradable paperboard-based blank made for a biodegradable-based laminate as claimed in claim 17, wherein said second adhesive tie material is ethylene based copolymers with grafted functional groups; modified polyethylene copolymers containing vinyl acetate acrylate, methacrylate comonomers; ethylene-based multi-polymer materials with grafted functional groups or ethylene-based multi-polymer materials without grafted functional groups.

19. A biodegradable paperboard-based container made from a biodegradable-based laminate comprising:
   a) a paperboard substrate having an interior side and an exterior side;
   b) at least one exterior layer of a low temperature extrusion coatable grade heat-sealable biodegradable polymer resin applied on said exterior side of said paperboard substrate; and
   c) an interior layer of a heat-sealable non-biodegradable polymer resin applied on said interior side of said paperboard substrate, which is heat-sealable with the exterior layer of a biodegradable polymer resin.

20. A biodegradable paperboard-based container made from a biodegradable-based laminate as claimed in claim 19, wherein said exterior layer of a low temperature extrusion coatable grade heat-sealable biodegradable polymer resin is thermoplastic polyvinyl alcohol resin or starch-based low density polyethylene polymer resin.

21. A biodegradable paperboard-based container made from a biodegradable-based laminate as claimed in claim 19, wherein said interior layer of a heat-sealable polymer resin is low density polyethylene polymer, ethylene vinyl alcohol copolymer, polyethylene terephthalate, glycol-modified polyethylene terephthalate, or acid-modified polyethylene terephthalate.

22. A biodegradable paperboard-based container made from a biodegradable-based laminate as claimed in claim 19 further comprising a barrier layer material placed on the interior of said paperboard substrate layer and directly contacting said interior heat-sealable polymer resin layer.

23. A biodegradable paperboard-based container made from a biodegradable-based laminate as claimed in claim 22, wherein said barrier material layer is ethylene vinyl alcohol copolymer, polyamide polymer, polyamide copolymer, polyethylene terephthalate, glycol-modified polyethylene terephthalate or acid-modified polyethylene terephthalate.

24. A biodegradable paperboard-based container made from a biodegradable-based laminate as claimed in claim 22, further comprising a first adhesive tie material layer placed between the interior of said paperboard substrate and said barrier material layer.

25. A biodegradable paperboard-based container made from a biodegradable-based laminate as claimed in claim 24, wherein said first adhesive tie material layer is ethylene based copolymers with grafted functional groups; modified polyethylene copolymers containing vinyl acetate acrylate, methacrylate comonomers; ethylene-based multi-polymer materials with grafted functional groups or ethylene-based multi-polymer materials without grafted functional groups.

26. A biodegradable paperboard-based container made from a biodegradable-based laminate as claimed in claim 22, further comprising a second adhesive tie material layer placed between said barrier material layer and said interior heat-sealable polymer resin layer.

27. A biodegradable paperboard-based container made from a biodegradable-based laminate as claimed in claim 26, wherein said second adhesive tie material is ethylene based copolymers with grafted functional groups; modified polyethylene copolymers containing vinyl acetate acrylate, methacrylate comonomers; ethylene-based multi-polymer materials with grafted functional groups or ethylene-based multi-polymer materials without grafted functional groups.

* * * * *